United States Patent
Krushnakant

(10) Patent No.: US 8,184,787 B2
(45) Date of Patent: May 22, 2012

(54) SYSTEM AND METHOD FOR GENERATING A PERSONALIZED BILL USING A PERSONAL ADDRESS BOOK

(75) Inventor: Chavan Krushnakant, Woburn, MA (US)

(73) Assignee: Comverse Ltd., Tel Aviv (IL)

(*) Notice: Subject to any disclaimer, the term of this patent is extended or adjusted under 35 U.S.C. 154(b) by 1286 days.

(21) Appl. No.: 11/776,845

(22) Filed: Jul. 12, 2007

(65) Prior Publication Data
US 2009/0016508 A1 Jan. 15, 2009

(51) Int. Cl.
*H04M 15/00* (2006.01)
(52) U.S. Cl. .......... 379/121.05; 379/114.03; 705/34
(58) Field of Classification Search .......... 379/111, 379/114.01, 114.03, 116, 117, 118, 119, 379/120, 121.04, 121.05, 122, 126, 127.01, 379/127.06, 130; 455/405–408; 705/34, 705/52
See application file for complete search history.

(56) References Cited

U.S. PATENT DOCUMENTS

| | | | |
|---|---|---|---|
| 5,425,087 A * | 6/1995 | Gerber et al. | 379/134 |
| 5,835,856 A | 11/1998 | Patel | |
| 5,842,174 A * | 11/1998 | Yanor | 705/34 |
| 5,898,918 A * | 4/1999 | Leppanen | 455/414.1 |
| 5,943,406 A * | 8/1999 | Leta et al. | 379/120 |
| 5,982,864 A | 11/1999 | Jagadish | |
| 6,256,515 B1 * | 7/2001 | Cox et al. | 455/565 |
| 6,282,274 B1 * | 8/2001 | Jain et al. | 379/114.26 |
| 6,304,857 B1 * | 10/2001 | Heindel et al. | 705/34 |
| 6,321,078 B1 | 11/2001 | Menelli | |
| 6,373,934 B2 * | 4/2002 | Jensen | 379/140 |
| 6,459,779 B2 | 10/2002 | Wardin | |
| 6,668,046 B1 | 12/2003 | Albal | |
| 6,751,296 B1 | 6/2004 | Albal | |
| 6,868,147 B2 | 3/2005 | Wardin | |
| 6,925,160 B1 * | 8/2005 | Stevens et al. | 379/121.05 |
| 6,956,942 B2 | 10/2005 | McKinzie | |
| 6,985,569 B2 | 1/2006 | Baker | |
| 7,046,988 B2 * | 5/2006 | Kotzin | 455/406 |
| 7,068,768 B2 | 6/2006 | Barnes | |
| 7,149,292 B2 | 12/2006 | Wardin | |
| 2001/0017915 A1 | 8/2001 | Wardin | |
| 2004/0266414 A1 * | 12/2004 | Likwornik | 455/415 |
| 2005/0043065 A1 | 2/2005 | Bekanich | |

* cited by examiner

*Primary Examiner* — Binh Tieu
(74) *Attorney, Agent, or Firm* — Ohlandt, Greeley, Ruggiero & Perle, L.L.P.

(57) ABSTRACT

A system and method is disclosed for creating a personalized phone bill populated with names from a subscriber's personal address book on the subscriber's device. A billing application receives a request to generate a phone bill for a subscriber, and obtains usage data for that subscriber's device. In one embodiment, the billing application then sends a request to a translation server to search a network address book, which is synchronized with the personal address book on a subscriber's device, to match the usage data with the names from the network address book. The matched names are then transmitted from the translation server to the billing application, where the billing application includes the matched names in a usage section of the bill, thereby generating a personalized phone bill that a subscriber can more easily review and understand.

19 Claims, 2 Drawing Sheets

SYSTEM AND METHOD FOR GENERATING A PERSONALIZED BILL USING A PERSONAL ADDRESS BOOK

FIELD OF THE INVENTION

The present invention relates to a system and method for creating a billing record, and more specifically to a system and method for generating a personalized phone bill using the personal address book on a subscriber's device.

BACKGROUND OF THE INVENTION

With the advent of personal address books on devices such as cell phone handsets and PDAs, subscribers can store the phone number of a contact using that contact's name, or any other designation the subscriber chooses. When the subscriber needs to call a contact, the subscriber simply searches through an alphabetical list of contacts in the personal address book, which lists the customized names of the subscriber's contacts. Many subscribers don't remember or even bother to learn the telephone numbers of the contacts in the subscriber's personal address book, since the subscriber just uses the personal address book on the device to search for a contact by name before placing a call or sending a message.

When a telephone subscriber receives a bill, a part of the bill is the usage section, which is a list of phone numbers that the subscriber dialed or received calls from during a billing period. Sometimes this list can be very long depending on phone usage. When a subscriber is not familiar with the phone numbers listed, it becomes very difficult to the subscriber to look at the usage section of the bill and recognize the calls made.

Attempts to solve this problem have met with limited success. Some solutions have proposed populating the phone bill with a name associated with the phone number. However, in existing systems, the names are pulled from a global address system, such as a phone company directory. In many cases, the global address system will list names, companies, or even numbers that do not correspond with the subscriber's knowledge of who was called or who called the subscriber. For example, phone company directories typically list the owner of a phone line, even though a different person may actually be using that line. In some cases, a company is listed in the global address system, even though the subscriber is making and receiving calls to an individual within that company. Additionally, large global address systems often have numerous errors and are infrequently updated, which makes the use of a global address system impractical.

Therefore, what is needed is a method for generating a personalized phone bill that provides accurate, personalized information to a subscriber to eliminate confusion on the phone bill.

SUMMARY OF THE INVENTION

The present invention solves the aforementioned problems and provides for the aforementioned needs by providing a system and method for creating a personalized phone bill populated with names from a subscriber's personal address book on the subscriber's device. A billing application receives a request to generate a phone bill for a subscriber, and obtains usage data for that subscriber's device. In one embodiment, the billing application then sends a request to a server to search a network address book, which is synchronized with the personal address book on a subscriber's device, to match the usage data with the names from the network address book. The matched names are then transmitted from the server to the billing application, where the billing application includes the names in the usage section of the bill, thereby generating a personalized phone bill that a subscriber can more easily review and understand.

In one embodiment of the present invention, a method of creating a personalized phone bill using a subscriber's personal address book comprises obtaining usage data for a subscriber's activity on a device; obtaining entries from a subscriber's personal address book; comparing the usage data with the entries in the subscriber's personal address book to find matching entries; and listing the matching entries from the personal address book in a usage section of a subscriber's phone bill, thereby creating a personalized phone bill.

In another aspect, the method further comprises obtaining the usage data for a subscriber's activity on a device from a billing application.

In a further aspect, the method further comprises obtaining the entries in the subscriber's personal address book from a network address book stored on a network database, wherein the network address book is synchronized with the personal address book of the device.

In still another aspect, the method further comprises synchronizing the subscriber's personal address book with the network address book using a synchronization server.

In a yet further aspect, the method further comprises communicating between the subscriber's personal address book and the synchronization server using a Synchronization Markup Language ("SyncML") message.

In another aspect, the method further comprises first determining if a subscriber has a network address book before obtaining the entries therefrom.

In still another aspect, the method further comprises comparing the usage data with the entries in the subscriber's personal address book using a translation server.

In a further aspect, the method further comprises first sending a request from a billing application to the translation server to compare the usage data with the entries in a subscriber's personal address book.

In a yet further aspect, the method further comprises communicating the information on the matched entries from the translation server to the billing application, wherein the billing application generates the personalized phone bill.

In another aspect, the method further comprises using an Extensible Markup Language ("XML") Data Management Service ("DMS") server (collectively, "XDMS server") as the translation server.

In yet another aspect, the method further comprises communicating between the translation server and the billing application using an XML Configuration Access Protocol ("XCAP") message.

In a further aspect, the method further comprises using a Java Database Connectivity ("JDBC") message for communicating between the network database and the synchronization server, and for communicating between the translation server and the network database.

In still another aspect, the method further comprises comparing the usage data with a system address book stored on a system database.

In a yet further aspect, the method further comprises replacing the usage data on the personalized phone bill with the matching entries from the subscriber's personal address book.

In one aspect, a system for creating a personalized phone bill using a subscriber's personal address book comprises a synchronization server to synchronize a subscriber's personal address book with a network address book, wherein the network address book is stored on a network database; a translation server for comparing a subscriber's usage data with the information on the network address book to find matching entries; a billing application for providing the subscriber's usage data to the translation server, and for receiving the matching entries from the translation server to generate a personalized bill by listing the matching entries in a usage section of a subscriber's phone bill.

In another aspect, the system further comprises a system address book stored on a system database for comparing a subscriber's usage data thereto.

In still another aspect, the synchronization server communicates with the subscriber's personal address book using a Synchronization Markup Language ("SyncML") message.

In a further aspect, the translation server is an Extensible Markup Language ("XML") Data Management Service ("DMS") server (collectively, "XDMS server").

In a yet further aspect, the translation communicates with the billing application using an XML Configuration Access Protocol ("XCAP") message.

In another aspect, the network database and the synchronization server and the translation server and the network database communicate using a Java Database Connectivity ("JDBC") message.

DETAILED DESCRIPTION OF THE INVENTION

The system and method of creating a personalized phone bill using a personal address book provides for a simple, easy to understand phone bill that eliminates confusion for a subscriber when reviewing the bill. In one aspect of the present invention, the usage data is matched with entries in the personal address book on a subscriber's device, so as to minimize the risk of confusion on the bill.

The only source of calling party information that is easily and quickly understood by a subscriber is the personal address book of the subscriber's device, which the subscriber has personally programmed and created. In the personal address book, the subscriber can customize the name or party associated with each entry in the personal address book, so that the particular entry will always be recognized when that subscriber calls that party, or when that party calls the subscriber.

Figure 1:
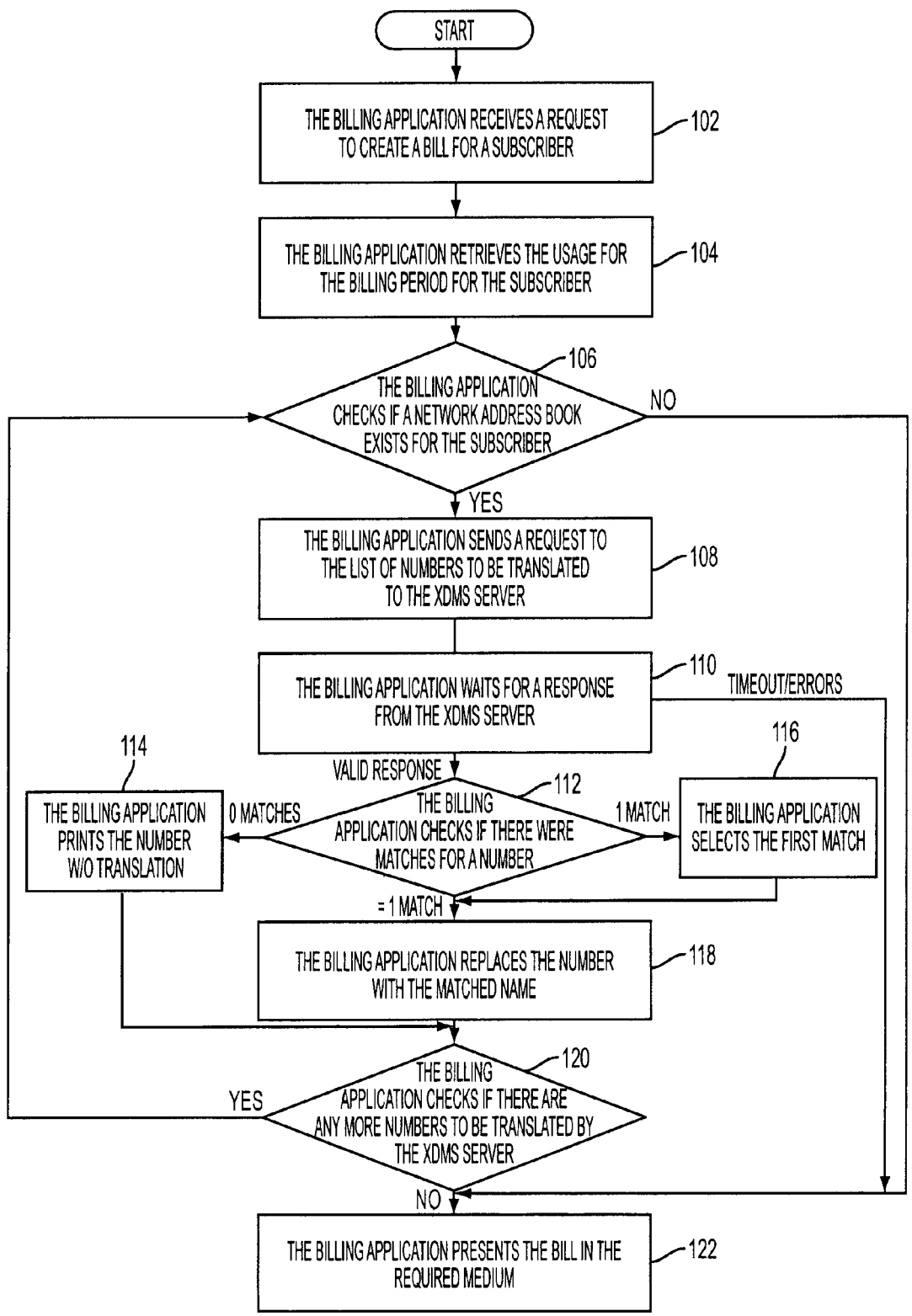
FIG. 1 is a flow chart depicting the method of generating a personalized phone bill from a subscriber's personal address book according to one aspect of the present invention.

In one aspect of the present invention, a billing application, such as a proprietary software program used by a phone company, populates the usage section of a phone bill with the entries from a subscriber's personal address book. FIG. 1 is a flow chart that illustrates the operations associated with a method conforming to various aspects of the present invention. The billing application first receives a request to create a bill for a subscriber (operation 102). Next, the billing application retrieves a set of usage data reflecting the subscriber's activity on the device over a selected billing period (operation 104), such as phone calls or SMS/MMS text messaging. In the present embodiment, a network address book is maintained by the subscriber's service provider, and the network address book is regularly synchronized with the subscriber's personal address book, using, for example, HTTP ("Hyper Text Transfer Protocol") with SyncML ("Synchronization Markup Language") messages. The SyncML messages can be used for a variety of purposes related to synchronizing, such as an address book, calendar, or task list. The billing application then verifies that a network address book exists for the subscriber (operation 106). In one aspect, the verification process includes sending a request from the billing application to a translation server. In one aspect, an Extensible Markup Language ("XML") Configuration Access Protocol ("XCAP") request is sent from the billing application to an XML Data Management Service ("XDMS") translation server. The XDMS translation server is an HTTP server that receives a "Get" message to obtain a subscriber's identification. The XDMS translation server then uses the subscriber identification to fetch the address book for a particular subscriber from a network database. The XDMS translation server searches the network database and responds by indicating if a network address book exists for the particular subscriber, and the number of entries in the network address book.

If a network address book is present, the billing application sends a second XCAP request to the XDMS translation server (operation 108) for the XDMS translation server to translate the phone numbers in the usage data using the network address book. The XDMS translation server searches the network address book for the phone numbers and responds with the contact name for every entry it finds in the network address book of the subscriber. If no matching entry is found for a phone number in the network address book, the XDMS translation server can search the system or global address book, such as the yellow or white pages of a phone company's database, to find a matching entry. This secondary searching feature is particularly beneficial when the subscriber calls numbers that are not stored in the subscriber's personal address book.

The billing application then waits for a response from the XDMS translation server (operation 110). Once the XDMS translation server has completed the search, a response in the form of an XML document is generated with the number and matching display name for each number that was found. Once a response is received, the billing application checks the response data to determine if any matches were made with the numbers from the usage data (operation 112). The billing application can parse the XML document and replace the telephone numbers with the value in a display name category. However, if none of the address books searched produces a match to the phone numbers in the usage data, the billing application will simply print the numbers in the phone bill without any additional information (step 114). In the opposite situation, such as when multiple matches are found, the XDMS translation server could, in one aspect, select the first match found (operation 116). Once a match is identified by the billing application, in one aspect, the number is replaced with the matched name (operation 118). In another aspect, the matched name can be included with the phone number to provide all the usage data to a subscriber. The billing application does one final check to determine if any other numbers can be translated by the XDMS translation server (operation 120), but if not, the billing application generates the phone bill with the matched entries in the usage data (operation 122).

In an alternate embodiment, the billing application can generate personalized data for any type of data transmission a user needs, such as text messaging or even web usage.

The bill can be generated in any format desired by the subscriber, such as a paper print out or an electronic document. Additionally, as noted above, the bill can contain as much or as little of the usage information as the subscriber prefers. Although the matched name entries from the personal address book can completely replace the listed phone numbers, some subscribers may prefer to have both the phone number and matched name information listed in the usage section of their bill.

The synching of the network address book is accomplished with an architecture using the following components: 1) handset or device to be synchronized, 2) Synchronization server, and 3) Synchronization source (such as an address book store). Typically synchronization is initiated by the device where it sends a SyncML message with the identification information about the device, the credentials, and the synchronization source it wants to synch with. The Synchronization server validates the device and credentials and sends a response indicating a success/failure. When successful, if the synchronization device is synching for the first time it will send all the information on the handset to server. The Synchronization server will update the synchronization source with this information and send status information. If the synchronization device had synched earlier then it will only send the entries that changed on the handset since the last synchronization. Once the device has finished sending all its changes and the server has acknowledged the changes it will request for all the changes that happened on the synchronization server. The synchronization server will not send all the information that changed since the last synchronization to the device. The device will update itself and acknowledge the changes. Once both sides are finished sending the changes they will end the synchronization process by storing the current date. A synch can also be initiated by the server and it is referred to as a "Server Alerted Synchronization."

In an alternate embodiment, protocols other than XCAP and XDMS could be used to communicate with the network address book. A proprietary binary message, for example, would provide an advantage of being easier to translate and faster to transfer, although the XCAP protocol is more standardized.

Figure 2:
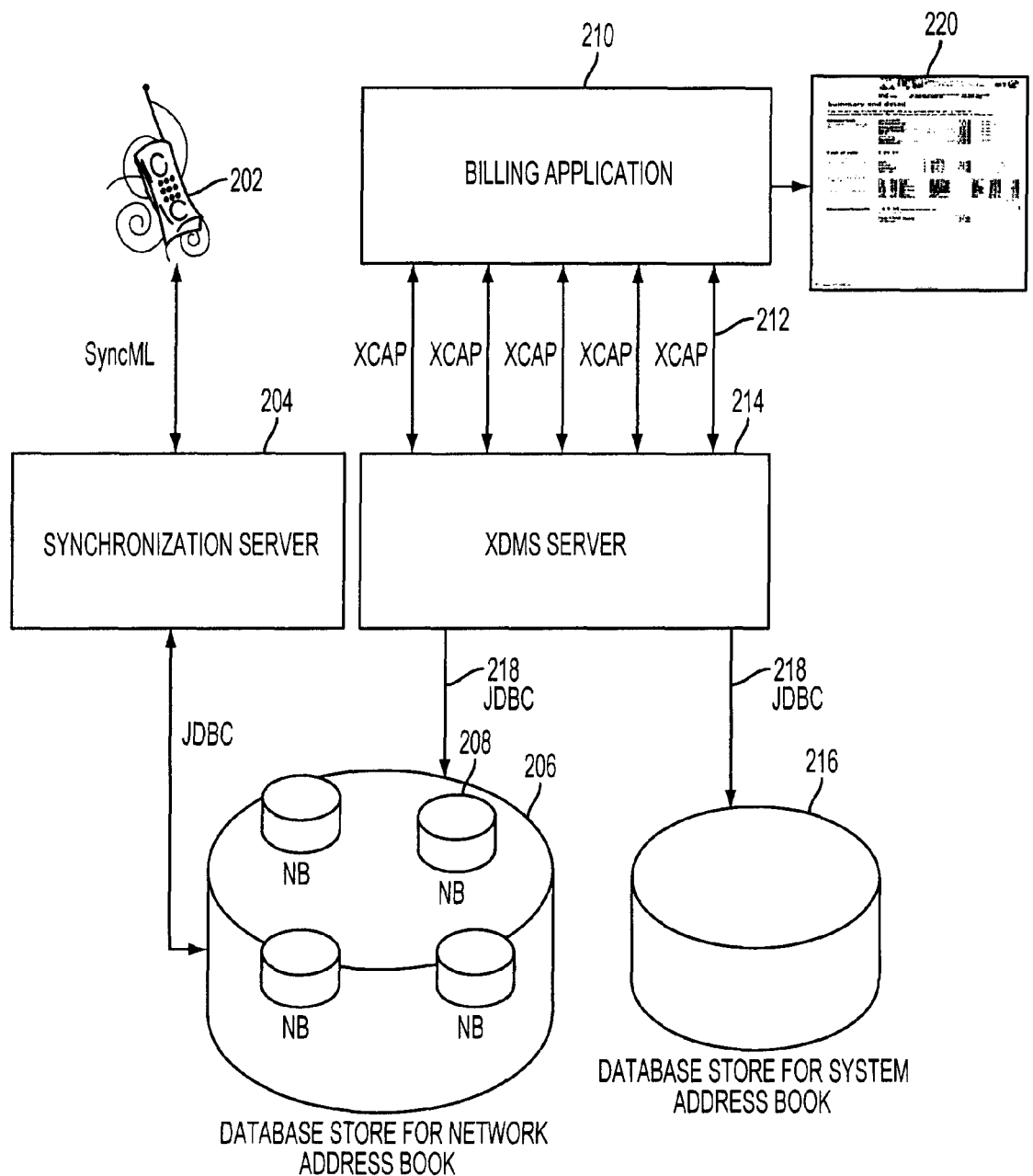
FIG. 2 is a diagram illustrating the components of a system for generating a personalized phone bill from a subscriber's personal address book, according to one aspect of the present invention.

One embodiment of the present invention is illustrated in the diagram of FIG. 2, which shows the components of a system for generating a personalized phone bill according to one aspect of the invention. The device 202, such as a cellular phone, is configured to interact with a synchronization server 204 that synchronizes the device subscriber's personal address book with a network database 206 that stores the network address book 208, which is a copy of the subscriber's address book on the network. It is the synchronization server 204 that is synchronized with the personal address book of the subscriber's device 202 using a SyncML message. The synchronization server 204 then synchronizes with the network address book 208 using a Java Database Connectivity ("JDBC") message. In one aspect of the present invention, the synchronization server 204 automatically synchronizes the personal address book of the device 202 with the network address book 208 at regular intervals, so that the network address book 208 is almost always up to date. However, since it is only critical that the network address book 208 be up to date at the time the bill is to be generated, the synchronization server 204 could be configured to only synchronize the device 202 and the network database 206 at a specified time, such as immediately before the bill is generated.

In the current aspect, the billing application 210 will send a series of XCAP messages 212 to an XDMS translation server 214 to request information on the existence of a network address book 208 for a subscriber and request that the XDMS translation server 214 translate and match up usage data with the network address book entries. The XDMS translation server 214 will also send information to a system database 216 that contains a system address book, which may be used by the XDMS translation server 214 to locate information on the usage data that is not available from the network address book 208. The XDMS translation server 214 coordinates the communication between the database 206 with the network address book 208 and the system database 216 that contains the system address book. In one aspect, as illustrated in FIG. 2, the communication 218 between the XDMS translation server 214 and the network database 206 and system database 216 is a standard JDBC protocol message.

Finally, once the billing application 210 has obtained all the matches between the usage data and the network address book 208, the billing application 210 generates a personalized bill 220.

Various aspects of the present invention, whether alone or in combination with other aspects of the invention, may be implemented in C++ code running on a computing platform operating in a LSB 2.0 Linux environment. However, aspects of the invention provided herein may be implemented in other programming languages adapted to operate in other operating system environments. Further, methodologies may be implemented in any type of computing platform, including but not limited to, personal computers, mini-computers, mainframes, workstations, networked or distributed computing environments, computer platforms separate, integral to, or in communication with charged particle tools, and the like. Further, aspects of the present invention may be implemented in machine readable code provided in any memory medium, whether removable or integral to the computing platform, such as a hard disc, optical read and/or write storage mediums, RAM, ROM, and the like. Moreover, machine readable code, or portions thereof, may be transmitted over a wired or wireless network.

While the invention has been described with reference to particular embodiments thereof, it is not limited to those embodiments. Specifically, various variations and modifications may be implemented by those of ordinary skill in the art without departing from the invention's spirit and scope, as defined by the appended claims. Additionally, any above-cited prior art references are incorporated herein by reference.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting.

What is claimed is:
1. A method of creating a personalized phone bill using a subscriber's personal address book, comprising:
 obtaining usage data for a subscriber's activity on a device;
 obtaining entries from a subscriber's personal address book;
 comparing the usage data with the entries in the subscriber's personal address book to find matching entries;
 replacing the usage data on the personalized phone bill with the matching entries from the subscriber's personal address book; and listing the matching entries from the personal address book in a usage section of a subscriber's phone bill, thereby creating a personalized phone bill.

2. The method of claim 1, further comprising obtaining the usage data for a subscriber's activity on a device from a billing application.

3. The method of claim 1, further comprising obtaining the entries in the subscriber's personal address book from a network address book stored on a network database, wherein the network address book is synchronized with the personal address book of the device.

4. The method of claim 3, further comprising synchronizing the subscriber's personal address book with the network address book using a synchronization server.

5. The method of claim 4, further comprising communicating between the subscriber's personal address book and the synchronization server using a Synchronization Markup Language ("SyncML") message.

6. The method of claim 3, further comprising first determining if a subscriber has a network address book before obtaining the entries therefrom.

7. The method of claim 2, further comprising comparing the usage data with the entries in the subscriber's personal address book using a translation server.

8. The method of claim 7, further comprising first sending a request from a billing application to the translation server to compare the usage data with the entries in a subscriber's personal address book.

9. The method of claim 7, further comprising communicating the information on the matched entries from the translation server to the billing application, wherein the billing application generates the personalized phone bill.

10. The method of claim 7, further comprising using an Extensible Markup Language ("XML") Data Management Service ("DMS") server (collectively, "XDMS server") as the translation server.

11. The method of claim 10, further comprising communicating between the translation server and the billing application using an XML Configuration Access Protocol ("XCAP") message.

12. The method of claim 11, further comprising using a Java Database Connectivity ("JDBC") message for communicating between the network database and the synchronization server, and for communicating between the translation server and the network database.

13. The method of claim 1, further comprising comparing the usage data with a system address book stored on a system database.

14. A system for creating a personalized phone bill using a subscriber's personal address book, comprising:
 a synchronization server to synchronize a subscriber's personal address book with a network address book, wherein the network address book is stored on a network database;
 a translation server for comparing a subscriber's usage data with the information on the network address book to find matching entries;
 a billing application for providing the subscriber's usage data to the translation server, and for receiving the matching entries from the translation server to generate a personalized bill by listing the matching entries in a usage section of a subscriber's phone bill.

15. The system of claim 14, further comprising a system address book stored on a system database for comparing a subscriber's usage data thereto.

16. The system of claim 14, wherein the synchronization server communicates with the subscriber's personal address book using a Synchronization Markup Language ("SyncML") message.

17. The system of claim 14, wherein the translation server is an Extensible Markup Language ("XML") Data Management Service ("OMS") server (collectively, "XDMS server").

18. The system of claim 14, wherein the translation communicates with the billing application using an XML Configuration Access Protocol ("XCAP") message.

19. The system of claim 14, wherein the network database and the synchronization server and the translation server and the network database communicate using a Java Database Connectivity ("JOBC") message.

\* \* \* \* \*